United States Patent [19]
Cogliano et al.

[11] 3,874,964
[45] Apr. 1, 1975

[54] LAMINATED FABRIC AND METHOD

[75] Inventors: Joseph A. Cogliano, Baltimore; Louis L. Wood, Rockville, both of Md.; Kurt C. Frisch, Grosse Ile, Mich.

[73] Assignee: W. R. Grace & Co., New York, N.Y.

[22] Filed: Apr. 23, 1973

[21] Appl. No.: 353,919

Related U.S. Application Data

[63] Continuation-in-part of Ser. No. 250,012, May 3, 1972, abandoned.

[52] U.S. Cl............... 156/78, 156/254, 161/161, 260/2.5 A, 260/2.5 AT, 264/45
[51] Int. Cl............................................ B32b 27/40
[58] Field of Search .... 260/2.5 AD, 2.5 AM, 2.5 A, 260/29.2 TN, 2.5 AY, 2.5 AT; 156/78, 254; 264/45; 161/160, 161, 190

[56] References Cited
UNITED STATES PATENTS

| | | | |
|---|---|---|---|
| 3,240,855 | 3/1966 | Voelker | 156/254 X |
| 3,457,203 | 7/1969 | Cohen et al. | 260/2.5 |
| 3,692,570 | 9/1972 | Traubel et al. | 260/2.5 AY |
| 3,789,027 | 1/1974 | Traubel et al. | 260/2.5 AY |

*Primary Examiner*—Edward G. Whitby
*Attorney, Agent, or Firm*—Eugene M. Bond

[57] ABSTRACT

The invention disclosed is for a laminated fabric and particularly carpet fabric, wherein a resinous foam core is sandwiched between and bonded to two outer surface layers. The resinous foam core consists essentially of a hydrophilic crosslinked polyurethane component prepared by reacting an isocyanate capped polyoxyethylene polyol reactant with large amounts of an aqueous reactant. After the sandwich structure of fabric-resin-fabric is formed, the resin is foamed and cured following which it is split into two substantially identical foam backed laminates. Alternately, the two backings may be different if desired. Desirably, the exposed foam surface of the laminate is texture treated prior to use. The resultant fabric laminate may be characterized with a broad spectrum of improved properties including improved comfort, moisture control, ease of processing and when containing selective additives, with fire retardancy, sound deadening or like characteristics.

22 Claims, 5 Drawing Figures

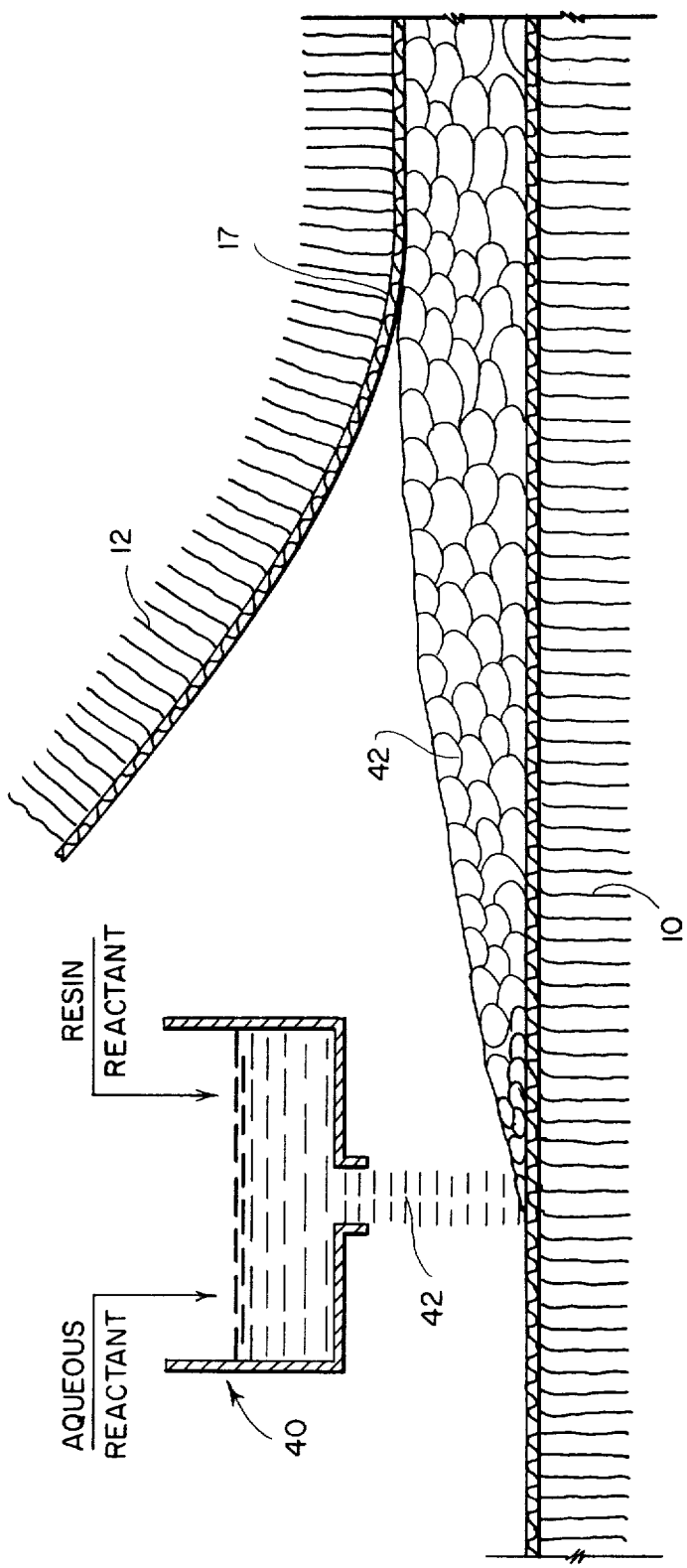

//3,874,964

LAMINATED FABRIC AND METHOD

This application for United States Letters Patent is a continuation-in-part of application Ser. No. 250,012, filed May 3, 1972, now abandoned.

This invention relates to backings of hydrophilic crosslinked polyurethane foams for a surface layer; and to a method and apparatus for their preparation. More particularly, the present invention relates to a method and apparatus for preparing carpets backed with new improved hydrophilic foams prepared from a capped polyoxyethylene polyol reactant having a defined average reaction functionality greater than two which is then admixed with large amounts of an aqueous reactant.

Numerous attempts have been made in the prior art to produce polyurethane laminates. Typically, these laminates include polyurethane foams which are difficult to control in processing or otherwise result in a poor product in that the backing readily crumbles in use.

It has heretofore been proposed to provide coatings and backings for various articles, such as webs of carpeting, rugs and other bodies by applying thereto a material adapted to adhere and foam to provide a soft, cellulated layer imparting to the web cushioning properties and increasing the friction between the web or rug and the supporting surface, such as a floor, to which such articles may be applied. In conventional processes in which a liquid, foamable material is applied to a supporting material, such as a web of carpeting or a rug, and is then allowed to foam, the free surface of the foamed material tends to foam a relatively smooth, impermeable skin which is low in coefficient of friction. In many instances, it is desirable that the cellular layer be quite thin, e.g., below one half inch, for example, one quarter or even one eighth inch in thickness. It is often difficult or expensive to form layers of uniform thickness of such thinness. Laying down a layer of foamable polyurethane resin of proper and uniform thickness upon a single surface is often highly difficult. This difficulty is increased if the surface to which the foam is applied is irregular.

It has also been proposed to form a sandwich structure of carpet-foam-carpet which then is split to provide articles having a foam backing. Because of the nature of such foams, i.e., they require careful control or extended periods of cure, they have not generally realized commercial acceptance and the resultant foam readily crumbled in use while having relatively poor surface resistance.

In accordance with the present invention, the foregoing difficulties are reduced or eliminated by filling in a liquid layer of a foamable material, between a pair of articles to be coated. The formable material is then allowed to foam and is cured to obtain a sandwich in which the two articles are bonded together by the foam. When the foaming and curing operation is sufficiently advanced or complete, the intermediate foam layer is sliced to provide two laminar structures, each comprising an exposed layer, the faces of which are preferably texture treated by application of heat and pressure means.

The foam layer as formed is usually double the thickness of the single final foam layer, thus reducing or eliminating difficulties of forming uniform thin layers. Since the foams during the soft stage are completely covered upon both sides, it is easy to limit movement of the outer layers due to expansion of the foam. The thickness of the foam layer is thus adequately regulated.

Generally, the present invention is based on a crosslinked hydrophilic foam prepared by capping polyoxyethylene polyol with a polyisocyanate such that the capped product has a reaction functionality greater than two, which is foamed simply by combining with an aqueous reactant, thus providing an improved, simply formed backing for surface structures. Also, because the present resin reactants are simply foamed with an aqueous reactant, there results a process having great economic advantage over prior art systems. Optionally, the capped product and/or aqueous reactant may contain a suitable crosslinking agent, if desired, in which case the capped polyoxyethylene polyol product may have a functionality approximating 2.

In one method of the present invention, a resinous core of resin reactant is disposed onto one surface layer after which the aqueous reactant is applied by suitable means such as pour or spatter pour or spray elements. Following application of the aqueous reactant, the resin begins to foam and thereupon is laminated a second surface layer. The resin is foamed and cured following which it is split into two substantially identical foam backed laminates. Next and most desirably, the exposed foam surface of the laminate is texture treated by use of heat and pressure prior to use. Preferably, the present method is performed by mixing the prepolymer and aqueous component by conventional polyurethane foam spray or pour equipment prior to application to the surface of the first laminate.

Practice of the present invention will become more apparent from the following detailed description taken in conjunction with the drawings wherein:

FIG. 5 is a diagrammatic view illustrating the preferred method wherein components are intermixed prior to application.

Figure 1:
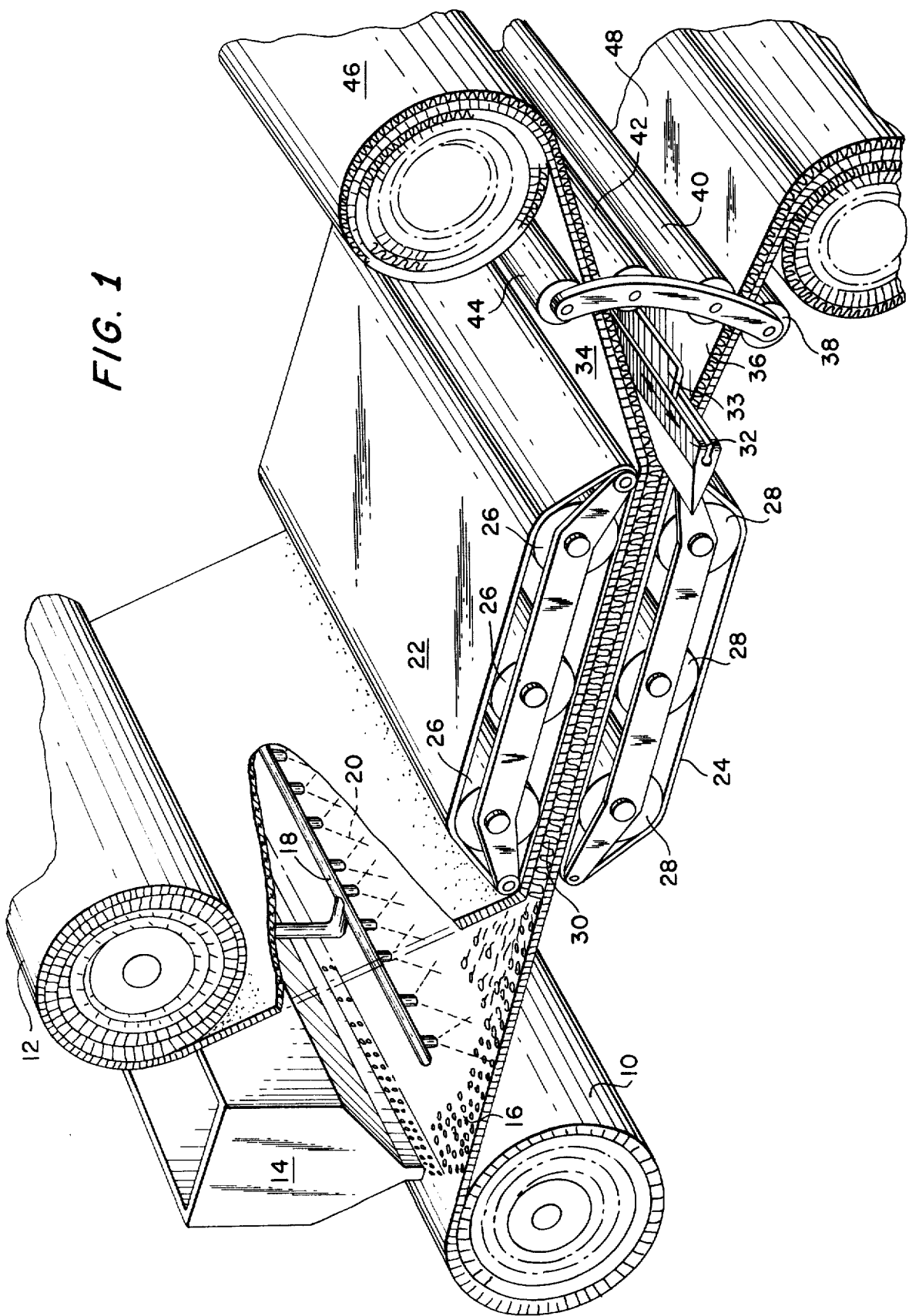
FIG. 1 is a perspective view taken in partial section and illustrating an apparatus useful for preparing the present laminates.
Figure 2:
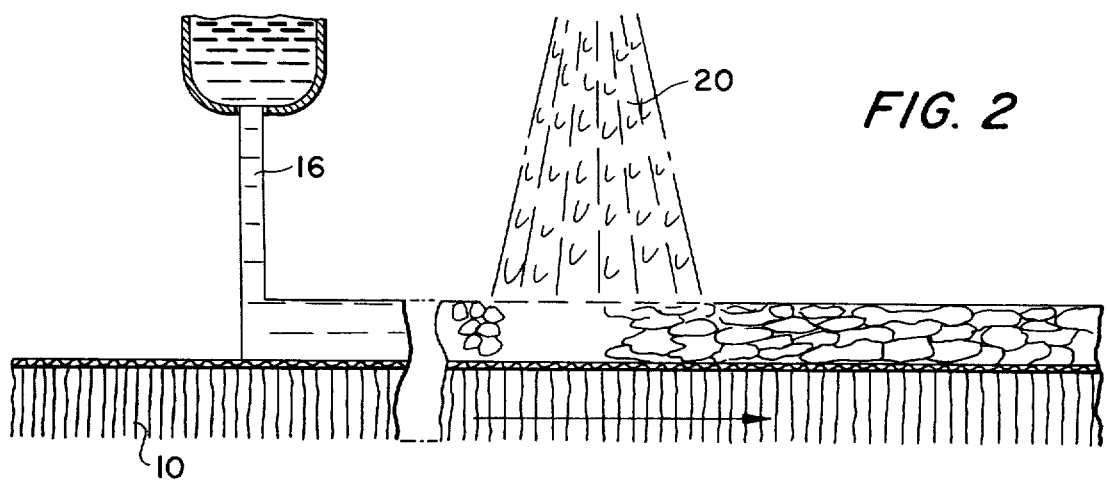
FIG. 2 is a diagrammatic view illustrating the method step of depositing resin onto a substrate and application of an aqueous reactant.
Figure 3:
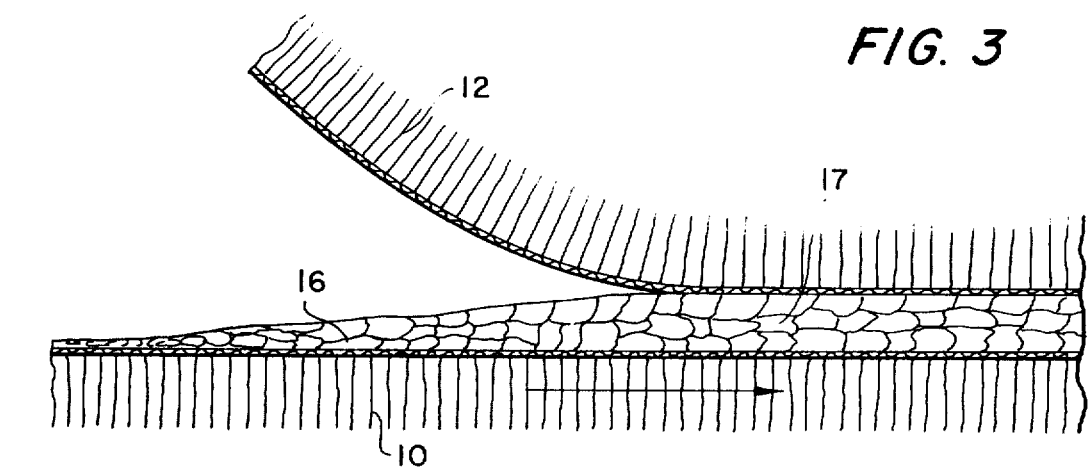
FIG. 3 is a diagrammatic view illustrating the method step of laminating a substrate layer over deposited resin during foaming.
Figure 4:
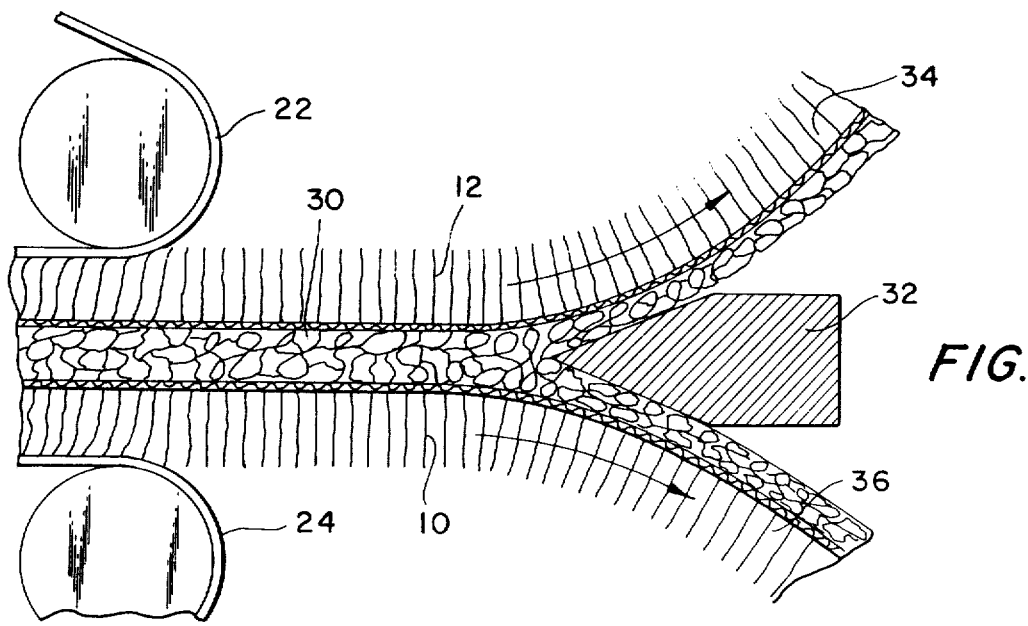
FIG. 4 is a diagrammatic view illustrating the method step of splitting the prepared sandwich structure into two substantially identical laminates.

Referring to the drawings wherein similar numerals represent corresponding elements throughout the several views, there is illustrated a method and apparatus for forming a composite body comprising a surface layer of a suitable material and a backing layer having a face formed by slicing through a foam constituting an intermediate layer in a three-ply sandwich structure. The two layers of material to be bonded together by foam resin and then separated by slicing through the foam layer are received from rolls 10 and 12 and comprise a base of fabric of woven threads and a pile or nap of upstanding fibers. The fabrics on rolls 10 and 12 may be alike or different from one another as desired.

Resin reactant may be disposed onto layer 10 from supply trough 14 and appears as un-reacted resin 16. Next, aqueous reactant 20 from supply line 18 may be dispensed following which foaming is initiated. During foaming, second layer 12 is laminated onto the foaming resin.

The present apparatus has a continuously operative lower horizontal belt conveyor 24 about rolls 28, and in spaced relationship, continuously operative upper belt conveyor 22 about rolls 26. Also included but not shown are two continuously operative side belt conveyors, the working runs of which extend along the respective side edges of the run of the lower horizontal belt conveyor thus to contain foaming resin between the surface layers.

After foam section 30 has cured, it passes a slicer or splitter 32 from which two substantially identical laminates 34 and 36 emerge.

The slicer or splitter may include a flexible band of steel or other appropriate material provided along one edge with serrations or scallops not shown which is also beveled to a cutting edge. This band is mounted upon suitable driving rollers similar to those of a conventional band saw, upon shafts. The back of the splitter or slicer band travels in a groove in a guide bar 33 which is rigidly mounted to maintain the band in fixed position. After begin split, the sections are drawn away at an angle for separation. By thus separating the sections, tension is placed along the line of cutting whereby to facilitate the splitting action.

Finally the two plies, each being provided with a layer of foamed polyurethane resin, are texture treated by rolls 38–40 along the lower section, and rolls 42–44 along the upper section. Typically, one of the texturing rolls is heated by convenient means such to effect a textural pattern by heat-setting the surface of the foam layer. Thereafter, the sections are wound up on the take up rollers 46 and 48 for storage or for subsequent treatment as may be required.

In the embodiments of the apparatus as shown, FIG. 5, the two components are laid down as a pre-mixed, single stream upon the webs which are to be sandwiched together. It will be apparent that the reactive components may be discharged under pressure through spray nozzles upon one or both of the webs. The webs may then be pressed together and cured to provide a three layer sandwich which can be split by slicing through the foam layer. In event that travelling webs to be coated are wide, a plurality of spray nozzles may be spaced across the width of the webs.

The time of pressure-heat treatment on the foam surface will, of course, vary as desired for a particular foam composition as well as the resultant pattern desired in the textured finish. At the given temperatures and pressures preferably employed herein, the time of treatment need only be less than about 3 minutes and most typically about 0.1 to 5 seconds and up to about 1 minute. Wide variations of time are recognized and are thus permissible.

Surfaces treated by the present method may be characterized with a compressed, fused, tough, elastomeric skin which is integrally bonded to subsurface foam. The treated surface when texturized by a relatively smooth pressure means has a pleasant, supply, leather-like quality which closely simulates natural leather.

Especially significant of the surface treated foams is that they retain a hydrophilic nature which allows water vapor to transpire therethrough, thus giving greater comfort and feed properties.

When the foam surface is embossed, the resultant product may have a decorative, e.g., fabric-like appearance as desired.

The foam surface which is exposed may be surface treated by means of heat and pressure such to provide a textured finish. The pressure means may include an embossing surface or may be configurated as desired such that the textured finish of the foam surface is smooth, leather-like, embossed, or otherwise configurated as desired.

The amount of pressure applied to the foam surface during surface treatment may vary and typically is about 0.1 to about 20 tons pressure per square foot and preferably about 0.5 to 15 tons per square foot, and most desirably about 1 to about 10 tons similar basis.

The amount of heat applied to the foam surface during surface treatment may vary and typically is about 110°C. to about 250°C., and preferably about 150°C. to about 200°C.

The surface treatment may, of course, be by means of a stamping plate having means for heating the surface thereof during pressing. Preferably, however, for continuous operation, surface treatment is effected by roller elements, one of which includes heating means during foam surface contact.

The surfaces of the foam layers comprising the open cells are characterized by remarkably high resistance to slippage even upon smooth polished surfaces, such as glass or polished floors. This resistance often substantially exceeds that of foamed rubber and other conventional backing materials sometimes employed with carpeting or rugs.

Crosslinked hydrophilic foam useful herein may be prepared by capping polyoxyethylene polyol with a polyisocyanate such that the capped product has a reaction functionality greater than two.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional component such as one having from three up to about six or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 20,000, and preferably between about 600 to about 6,000, with a hydroxyl functionality of about 2 or greater, preferably from about 2 to about 8.

Polyoxyethylene polyol is terminated or capped by reaction with a polyisocyanate. The reaction may be carried out in an inert moisture-free atmosphere such as under a nitrogen blanket, at atmospheric pressure at a temperature in the range of from about 0°C. to about 120°C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisocyanates and polyisothiocyanates which are PAPPI-1 (a polyaryl polyisocyanate as defined in U.S. Pat. No. 2,683,730), tolylene diisocyanate, triphenylmethane-4,4',4''-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha,alpha'-diisothiocyanate, 3,3'-dimethyl-4, 4'-biphenylene diisocyanate, 3,3'-dimethoxy-4, 4'-biphenylene diisocyanate, 2,2',5,5'-tetramethyl-4, 4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio.

To obtain the maximum strength, solvent resistance, heat resistance, resistance to compression set and the like, the isocyanate capped polyoxyethylene polyol reaction products are formulated in such a manner as to give crosslinked, three dimensional network polymers on foaming. In order to achieve such infinite network formation on foaming, the reactive components may be formulated in one of the following by way of example. First, when water is the sole reactant with the isocyanate groups leading to chain growth during the forming process, the isocyanate capped polyoxyethylene polyol reaction product must have an average isocyanate functionally greater than 2 and up to about 8 or more depending upon the composition of the polyol and capping agent components. Secondly, when the isocyanate capped polyoxyethylene polyol has an isocyanate functionally of only about two, then the water or aqueous reactant used may contain a dissolved or dispersed isocyanate-reactive crosslinking agent having an effective functionality greater than two. In this case, the reactive crosslinking agent is reacted with the capped polyoxyethylene polyol when admixed during the after the foaming process has been initiated. Thirdly, when the isocyanate capped polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with water or aqueous reactant, optionally containing a dissolved or dispersed reactive isocyanate-reactive crosslinking agent, leading to a crosslinked, infinite network hydrophilic polyurethane foam.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing starter component such as glycerol, trimethylolpropane, or trimethylolethane and the like which leads to polyoxyethylene triols. The molecular weight of these polymeric triols so prepared may be varied greatly depending on the number of moles of ethylene oxide used in the reaction with the starter component. Starter components such as pentaerythritol and sucrose likewise treated with ethylene oxide lead to polymeric polyoxyethylene tetrols and octols, respectively. Alternatively, polyols suitable for capping with polyisocyanate may be prepared from diols, triols, tetrols, hexols and polycarboxylic acids such as by the following mode:

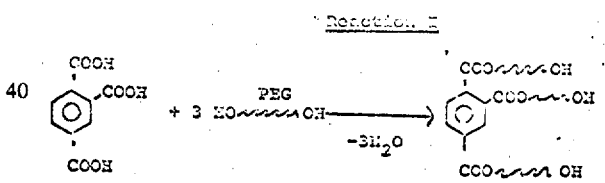

A useful polyisocyanate may be prepared from the reaction of a polyol with excess diisocyanate such as by the following mode:

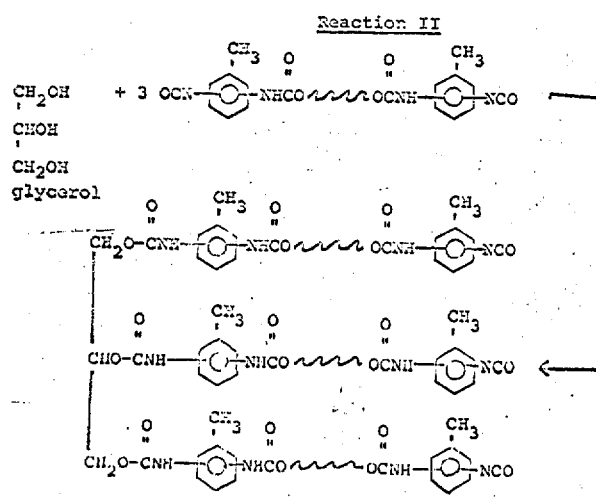

Any polyoxyethylene diols, triols, tetrols or hexols may be capped with isocyanate end groups by reaction with an appropriate amount of a polyisocyanate. The end capping reaction may be exemplified by the following illustrative equation:

Reaction III

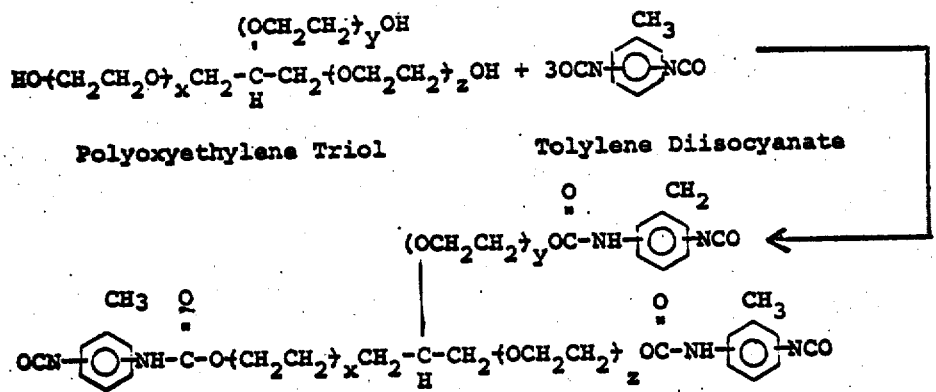

Isocyanate Capped Polyoxyethylene Triol (average functionality = 3)

Obviously the exact structure of the isocyanate capped polyoxyethylene polyols may be very complex and the simplified version shown in the above reactions is for purposes of illustration only. Further, blends or mixtures of the various polyols and/or polyisocyanates may be used as desired so long as the total average isocyanate functionality of the final urethane containing reaction product is greater than two.

Another possible mode used to prepare the capped polyoxyethylene polyol reaction product having an average isocyanate functionality greater than two is by reacting polyoxyethylene glycol having a reactive functionality equal to 2, with a molar excess of a diisocyanate which leads to an isocyanate capped polyurethane product (A) having an isocyanate functionality of two. A polyol such as pentaerythritol having a reactive functionality equal to 4 is reacted with a large molar excess of a diisocyanate to form an isocyanate capped polyurethane intermediate product (B) having an isocyanate functionality of four. By blending the two isocyanate capped products thus prepared, i.e., products (A) and (B), in various molar proportions, the resulting product mixture has an average isocyanate functionality greater than two and on treatment with aqueous reactants will lead to new improved hydrophilic crosslinked polyurethane foams illustrative of the present invention. In addition, other monomeric or polymeric polyisocyanate crosslinking agents may be substituted for the tetraisocyanate product (B). Tolylene-2,4,6-triisocyanate having a reactive functionality of 3 is an example of a simple monomeric triisocyanate which may be usefully employed to achieve the same objective of imparting to the system an average isocyanate functionality greater than two. An example of a polymeric triisocyanate which may be similarly used is that shown in the descriptive Reaction III.

Still another useful mode within the scope of this invention for preparing crosslinked hydrophilic polyurethane foams is by using an isocyanate capped polyoxyethylene polyol reaction product having an average functionality of about two or greater which may be prepared as described previously. The technique following is crucial for those formulations where the average isocyanate functionality is only about two, because in these instances treatment with a large amount of water in foaming yields only a substantially linear, soluble thermoplastic foam having very little, if any, practical or commercial utility. Thus, when it is desired to carry out the foaming reaction using this latter technique, the water or aqueous reactant used is pre-treated to contain a polyfunctional crosslinking agent which is reactive with isocyanate end groups of the capped reaction product. Such crosslinking agents may be solubilized or dispersed in the water or aqueous reactant, and must be sufficiently compatible with the capped reaction product to be able to react with the isocyanate groups and thus cause a crosslinked, insoluble, thermosetting network to form while the foaming process takes place. In this technique, then, a crosslinking agent reactive with isocyanate groups is contained in the water or aqueous reactant. After mixing with the isocyanate capped polyoxyethylene polyol reaction products, a crosslinking reaction results which takes place during and after the foaming step begins to take place. The presence of the crosslinking agent in the water or aqueous reactant is crucial when the isocyanate capped reaction product has a functionality of only about two and only optional when the functionality thereof is greater than two.

Water soluble or water dispersible crosslinking agents operable in this invention desirably should be polyfunctional and reactive with isocyanate groups and include but are not limited to materials such as diethylenetriamine, triethylene-tetramine, tetraethylenepentamine, polyethyleneimine, glycerol, trimethylolpropan pentaerythritol, tolylene-2,4,6-triamine, ethylene diamine, aminoethanol, trimethylenediamine, tetramethylenediamine, pentamethylenediamine, hexamethylenediamine, ethanolamine, diethanolamine, hydrazine triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form during or after the foaming process begins to take place.

It has also been found that the capped polyoxyethylene polyol having an isocyanate functionality greater than two used to prepare a three dimensional network polymer must be present in an amount sufficient to insure formation of the dimensional network. Thus, amounts of the capped polyoxyethylene polyol having an isocyanate functionality greater than two in the component to be foamed range from about 3% by weight of this component up to 100% by weight. Thus, it is possible to include a capped polyoxyethylene polyol having a terminal member with an isocyanate functionality of two, i.e., a diisocyanate in an amount from 0% by weight up to about 97% by weight of the component to be foamed. The maximum amounts of diisocyanate used are limited to that necessary to permit crosslinking to take place during foaming, as contrasted to formation of a linear polymeric structure, and the properties desired in the finally prepared foam.

The polyoxyethylene polyols used in this invention are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously. Additional materials which effectively serve as starter materials include, for example, ethylene diamine, diethylene triamine, phosphoric acid, triethanolamine, trimethylolpropane, 2,2-dichloromethyl 1,3-propane diol or the like.

It is possible and sometimes desirable to incorporate small amounts of a relatively hydrophobic comonomer into the ethylene oxide based polymerization products. Thus, comonomers such as propylene oxide or butylene oxide may be copolymerized as a random copolymer, block-polymer, or both, such that the copolymers remain hydrophilic while having other desirable features for certain applications, namely, improved low temperature flexibility, resistance to compression set, resiliency and the like. Up to about 40 mole percent but desirably about 25 mole percent or less of the relatively hydrophobic comonomer may be copolymerized with the ethylene oxide monomer and still yield hydrophilic crosslinked network foams when those products are used as polyol intermediates in practicing the present invention. Thus, throughout the text of this document, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide content ranging from about 60 mole percent to about 100 mole percent, and preferably greater than about 75 mole percent.

To effect foaming and preparation of the crosslinked network polymer, the component including the isocyanate capped polyoxyethylene polyol having a functionality about 2 or greater is simply combined with a particular aqueous component. For simplicity, this isocyanate capped reaction component will herein be referred to as resin reactant.

The aqueous component may appear as water, steam, a water slurry or suspension, a water emulsion, or a water solution having water soluble materials disposed therein. For convenience, the aqueous component is referred to herein as an aqueous reactant.

In contrast to typical polyurethane reactions such as those using catalyst or like promotors where one mole of —NCO is reacted with one half mole water, the present reaction proceeds simply with a large but controlled excess of water, and thus permits foaming.

Using the present resin reactant and water in amounts from about 0.5 mole $H_2O$/mole NCO groups up to about 2 moles $H_2O$/mole NCO groups results in poor foaming unless materials such as surfactants or the like are included. Amounts up to about 2 moles $H_2O$/mole NCO require a catalyst. When using about 6.5 moles $H_2O$/mole NCO groups up to about 390 moles $H_2O$/mole NCO groups, surprisingly good foams result which include bound abrasive particles throughout. Thus, the available water content in the aqueous reactant is from about 6.5 to about 390 moles $H_2O$/moles NCO groups in the resin reactant, and desirably from about 20 to about 200 on the same basis.

"Available water" in the aqueous reactant is that water accessible for reaction with the resin reactant, and which is exclusive of water which may layer during reaction, or supplemental water which may be necessary because of further water-absorbtive or water-binding components or additives present in and forming the aqueous reactant.

The reaction temperature to effect foaming obviously is regulated by the viscosity of the resin reactant. The reaction may proceed either as a batch reaction or as a continuous reaction. Either the resin reactant may be poured onto the aqueous reactant, or both may be combined simultaneously such as when using spray or froth application techniques.

Thus, because large amounts of water may be in the aqueous reactant during reaction, i.e., the present invention is not dependent upon a molar NCO-water type reaction, it is possible to combine a great amount of additive materials within the reaction system prior to foaming which would be otherwise not possible with limited water reacting systems.

The aqueous reactant may be used at temperatures from about 0°C. to about 100°C. as desired. It is possible to effect reaction of the resin reactant using steam as the aqueous component.

By appropriate selection of materials entering into the reaction, it is possible to obtain polyurethane resin foams of a wide variety of properties. For example, the compositions may be so controlled as to obtain foams which are highly flexible and tough or which are comparatively rigid. In the preparation of a foam designed to constitute a backing for rugs, carpeting and such like articles, it is usually preferred so to tailor the foams as to obtain a considerable degree of flexibility and cushioning properties.

Large amounts of water soluble or water dispersible materials may be added to the aqueous reactant. These materials may be added to the aqueous reactant up to 800% by weight of the amount of water in the aqueous reactant, depending of course on the particular material and its weight. Useful additives to the aqueous reactant include organic and inorganic salts, alcohols, amines, acids, polymer latices, resin or wax dispersions, flame retardants, fungicides, fillers, blowing agents, fibers, cellulosics, surfactants, biostats, pigments, dyes, zeolites, enzymes, chelated, hydrogenation or cracking catalysts, thickeners, stabilizers, promoters or the like. By homogeneously distributing these materials in the aqueous reactant, it is possible to effect wide distribution of these materials throughout the finally prepared foam. Some or all of the above additives added may also be combined into the resin reactant if desired.

It is possible to dispose the resin reactant onto fabrics, either woven or non-woven, paper, or the like with the resin reactant appearing either on the surface or imbibed as desired. Thus, upon contact of such material with water, water spray, steam, or moist air, it is possible to prepare tough, flexible to rigid, soft to coarse products. Products using the present hydrophilic foams may be rendered repellant to liquid water yet breathable and thus permeable to water vapor.

The following examples will aid in explaining, but should not be deemed as limiting, practice of the present invention. In all cases, unless otherwise noted, all parts and percentages are by weight.

EXAMPLE 1

The following procedure was used to prepare a resin foam using relative amounts of reactants in sufficient quantity for preparing continuous laminates in the apparatus of FIG. 1.

To a reaction vessel containing 3,092 grams, representing 1 mole, 3 eq. OH, of a triol prepared from potassium hydroxide catalyzed reaction of 92 grams anhydrous glycerol with 3,300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70°C. by external cooling with water, while stirring for 4 hours. The actual isocyanate content, determined by titration with standard n-butylamine solution in toluene, remained at the constant level of 0.79 meq. NCO/gram relative to a theoretical content of 0.83 meq. NCO/gram. The resultant pale yellow syrup was found to solidify at about 30°–35°C., was soluble in toluene, and acetone, readily reacts with water, and had the following formula:

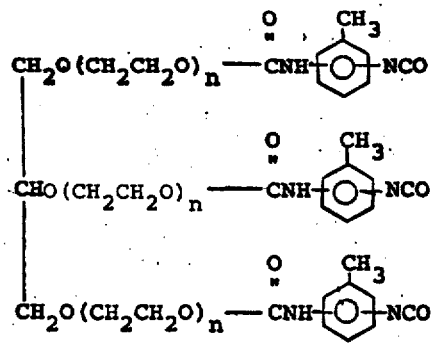

where n has an average value of about 22. The theoretical molecular weight of the resin product is about 3,615.

Twenty grams of the recovered resin having an eq. NCO content of 0.016 was reacted per 30 grams of water (1.7 moles), and was dispensed between two sections of carpeting. After 5 minutes at 25°C., the resultant sandwich of 1 inch foam between the two carpet sections was cut in half to give two carpet sections having one half inch foam layers laminated to their backs.

The finally prepared laminate was found to have an excellent feel while being tightly bonded to a carpet layer. When applied to a floor, the carpet showed superior ability to remain in place.

EXAMPLE 2

The procedure of Example 1 was repeated except using a foam prepared as followed.

A solution of 92 grams glycerol representing 1 mole, 3 eq. OH, and 1,000 grams of polyoxyethylene glycol 1,000 representing 1 mole, 2 eq. OH was outgassed at 100°C. and 10 Torr for 2 hours. To the outgassed solution was added 870 grams representing 5 moles tolylene diisocyanate having an 80/20 mixture of 2,4 isomer/2,6 isomer. The reaction solution was stirred at 60°C. for 4 hours whereupon the actual isocyanate content reacted a constant 2.49 meq. NCO/gram relative to a theoretical content of 2.54. The resin product has a pale orange color, a density of 1.10, and a viscosity (Brookfield No. 4 spindle) at 25°C. of 13,400 cps. 31.3 parts of the resin product representing 50 mole percent had a theoretical molecular weight of 615, and the following formula (idealized):

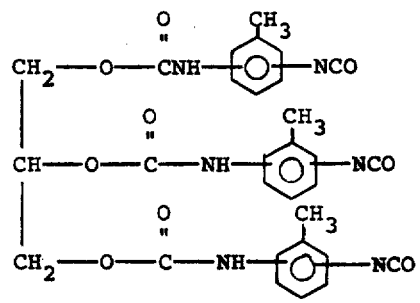

while 68.7 parts of the resin product representing 50 mole percent was found to be

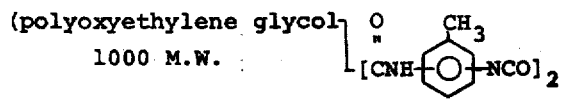

having a theoretical molecular weight of 1,348. The actual NCO content of this resin product was 2.49 meq. NCO/gram relative to a theoretical content of 2.54 meq. NCO/gram.

6.5 grams of the recovered resin having an eq. NCO content of 0.016 were reacted per 50 grams of water (2.8 moles). Corresponding results were realized.

EXAMPLE 3

The procedure of Example 1 was repeated except using a resin prepared by capping of a polyoxyethylene diol with a polyisocyanate having a functionality greater than 2, to give polyisocyanate foams with higher crosslink density and superior physical properties, lower solubility and greater hydrolytic stability than foams from polyoxyethylene diisocyanates. A 1,000 gram portion, 0.25 eq. OH, of polyoxyethylene glycol of 4,000 weight average molecular weight was outgassed at 110°C. and 10 Torr for 2 hours. Next, to this outgassed liquid was added at 60°C. 200 grams, 0.5 moles, 1.5 eq. NCO, of polymethylene polyphenylisocyanate commercially available under the name PAPI 901 by Upjohn Co. This latter material has nearly three isocyanate groups per molecule and an isocyanate equivalent weight of 133. A dark reaction solution was noted which was stirred at 60°c. to 70°C. for 5 hours whereupon the NCO content reached a constant 0.825 meq. NCO/gram relative to a theoretical value of 0.833. The resultant dark product syrup solidified at 45°C. to form a brown, waxy product.

Addition of 10 grams of water to each 10 grams of the prepared liquid polyisocyanate at 60°C. gave a highly satisfactory product laminate.

EXAMPLE 4

The procedure of Example 1 was repeated except using a resin prepared from copolymers of 75% ethylene oxide and 25% propylene oxide along with methylene dicyclohexyl diisocyanate which form a triisocyanate that readily reacts with water to give hydrophilic foams. A mixture of 13.4 grams, 0.1 mole of trimethylolpropane and 0.6 grams, 0.01 mole of potassium hydroxide was stirred at 100°–180°C. in the presence of 250 grams of ethylene oxide at 20 to 100 psi. After 3 hours the reaction pressure dropped to one atmosphere. To the reaction product syrup was then added 250 grams of propylene oxide with stirring at 100°–180°C., and a pressure of 20 to 75 psi for 4 hours whereupon the reaction pressure at 100°C. dropped to one atmosphere. To this reaction product syrup having a brown color was added 500 grams of ethylene oxide. The reaction was stirred at 100°–180°C. for 12 hours whereupon the reaction pressure dropped to one atmosphere at 100°C. The resultant brown oil was stripped of volatiles at 50 to 100°C. at 10 Torr resulting with 978 grams of brown syrup having a hydroxyl content of 0.32 meq. OH/gram relative to 0.31 meq./gram theory.

To 931 grams, 0.30 OH, of the prepared triol was added 88.0 grams, 0.32 moles, of dicyclohexylmethane diisocyanate. The solution stirred at 60°C. for 8 hours whereupon the NCO content of the polymer reached a constant 0.33 meq./gram relative to 0.32 theory. The triisocyanate product was characterized as a light amber syrup having a viscosity of 12,000 cps at 25°C. (Brookfield).

To a 10 gram portion of the above triisocyanate containing 0.1 gram of silicone surfactant L520 by Union Carbide was reacted 10 relative grams of water. The product foam exhibited excellent texture characteristics.

EXAMPLE 5

The procedure of Example 1 was repeated except using a foam prepared by crosslinking and three dimensional foam formation, using a polyoxyethylene glycol capped with diisocyanate, a polyamine during foaming, i.e., diethylene triamine (DETA), water and abrasive. The diisocyanate capped polyoxyethylene glycol resin product (DPG) had the following formula:

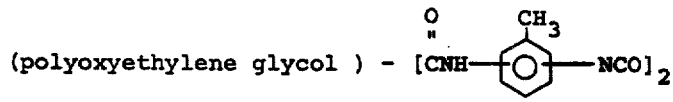

1000 M.W.

a molecular weight, theory, of 1,348, and an actual NCO content of 1.42 meq. NCO groups/gram relative to 1.49 meq. NCO groups/gram theory.

Twenty grams of this resin (DPG) having an eq. NCO content of 0.03 was reacted with 20 grams of water. Corresponding results were realized.

EXAMPLE 6

The procedure of Example 5 was repeated except using a polyol (glycerol) during foaming, in place of DETA. Again, corresponding results were realized.

EXAMPLE 7

The procedure of Example 5 was repeated except using a polythiol during foaming, i.e., pentaerythritol tetrakis (β-mercaptopropionate) commercially available from Carlisle Chemical Co. under the tradename "Q43," in place of DETA. Corresponding results were realized.

EXAMPLE 8

The procedure of Example 1 was repeated using the apparatus of FIG. 1 with rolls 40 and 42 preheated to about 200°C. whereas rolls 38 and 44 were maintained at a temperature between about 30°–50°C. Sufficient roll pressure was used to effect contact of all surface points of the foam layer with the hot roll surface. The surfaces of rolls 40 and 42 were prior coated with a fluorocarbon release agent to avoid foam sticking. Contact time was about 15 seconds. A product was recovered having a foam surface with excellent texture.

EXAMPLE 9

The procedure of Example 8 was repeated except using embossing rolls in place of rolls 40 and 42. Except for an embossed foam surface, corresponding results were realized.

Although the present invention has been described with particular emphasis on using carpet type fabric layers, it is recognized that these layers may be composed of fabrics generally, paper, polymer in films, and metal foil. In the latter cases, foam-coated foils such as of aluminum and paper prove effective as insulation materials whereas foam-backed fabrics may be employed in manufacture of upholstery.

Useful fabric materials which may comprise the fabric layer include, for example, wool, cotton, nylon, polyolefin or any other similar material or a mixture of two or more such materials. They may be woven, nonwoven, or knitted, etc.

The webs of carpeting indicated in the drawings may obviously be replaced by other flexible webs such as cloth, building paper, Bristol board, burlap or the like.

It is also feasible to use a release paper in film in place of the fabric or web materials. In this case an integral unbacked layer of foam is produced and the release paper can be re-used. The unbacked foam layer can, if desired, be embossed by heat and pressure either on one side only or on both sides as desired.

The simplicity and foolproof nature of preparing the foams without excessive expenditures for equipment characterizes the present foams especially economically attractive.

It is understood that the foregoing detailed description is given merely by way of illustration and that many variations may be made therein without depart-

What is claimed is:

1. A method for preparing a laminated fabric which comprises, foaming a resin reactant and an aqueous reactant component on one surface layer of fabric, laminating a second surface layer of fabric onto the foaming resin reactant, said foam having crosslinking hydrophilic resin reactant, said foam having crosslinking hydrophilic characteristics with three-dimensional network, and consisting essentially of a first component comprising isocyanate capped polyoxyethylene polyol having a reaction functionality greater than two, and a second component comprising aqueous reactant, the ratio of moles $H_2O$/moles NCO groups in said second and first components respectively being about 6.5 to about 390, splitting the foam layer, and recovering two foam backed laminates.

2. The method of claim 1 wherein the capped polyoxyethylene polyol is present in the first component in an amount from about 3% by weight up to 100% by weight, and wherein a capped polyoxyethylene polyol having a terminal member with an isocyanate functionality of two is present in an amount from 0% up to about 97% by weight.

3. The method of claim 1 wherein the polyoxyethylene polyol moiety of the isocyanate capped member has a weight average molecular weight of about 200 to about 20,000, and a hydroxyl functionality of about 2 to about 8.

4. The method of claim 3 wherein the weight average molecular weight is about 600 to about 6,000.

5. The method of claim 1 wherein the fabric is selected from the group consisting of paper, plastic and cloth.

6. The method of claim 1 wherein the fabric is carpet.

7. The method of claim 1 wherein the split foam surface is texture treated under heat and pressure.

8. The product prepared by the method of claim 1.

9. The method of claim 7 wherein the pressure is about 0.1 to about 20 tons per square foot and the roll temperature is about 110°C. to about 250°C.

10. The method of claim 9 wherein the pressure is about 0.5 to about 15 tons per square foot and the roll temperature is about 150°C. to about 200°C.

11. A method for preparing a laminated fabric which comprises, foaming a resin reactant and an aqueous reactant component on one surface layer of fabric, laminating a second surface layer of fabric onto the foaming resin reactant, said foam having crosslinking hydrophilic resin reactant, said foam having crosslinking hydrophilic characteristics with three-dimensional network, and a first component comprising isocyanate capped polyoxyethylene polyol having a reaction functionality equal to about two, a second component comprising aqueous reactant, and a third component comprising a crosslinking agent having a reaction functionality greater than two, the ratio of moles $H_2O$/moles NCO groups being about 6.5 to about 390 in said second and first components respectively.

12. The method of claim 11 wherein the crosslinking agent of the third component is a polyol.

13. The method of claim 11 wherein the crosslinking agent of the third component is a polyamine.

14. The method of claim 11 wherein the crosslinking agent of the third component is a polythiol.

15. The method of claim 11 wherein the crosslinking agent of the third component is a polyisocyanate.

16. The method of claim 11 wherein the fabric is biodegradable.

17. The method of claim 11 wherein the fabric is selected from the group consisting of paper, plastic cloth and leather.

18. The method of claim 11 wherein the fabric is carpet.

19. The method of claim 11 wherein the split foam surface is texture treated under heat and pressure.

20. The product prepared by the method of claim 11.

21. The method of claim 20 wherein the pressure is about 0.1 to about 20 tons per square foot and the roll temperature is abouot 110°C. to about 250°C.

22. The method of claim 21 wherein the pressure is about 0.5 to about 15 tons per square foot and the roll temperature is about 150°C. to about 200°C.

* * * * *